US011784781B2

(12) United States Patent
Lakhani (10) Patent No.: US 11,784,781 B2
(45) Date of Patent: Oct. 10, 2023

(54) FULL DUPLEX WIRELESS COMMUNICATION SYSTEM WITH SINGLE MASTER CLOCK

(71) Applicant: Abdul-Karim Lakhani, Burnaby (CA)

(72) Inventor: Abdul-Karim Lakhani, Burnaby (CA)

( * ) Notice: Subject to any disclaimer, the term of this patent is extended or adjusted under 35 U.S.C. 154(b) by 0 days.

(21) Appl. No.: 17/341,354

(22) Filed: Jun. 7, 2021

(65) Prior Publication Data

US 2022/0393849 A1 Dec. 8, 2022

(51) Int. Cl.
| | | |
|---|---|---|
| H04L 7/00 | (2006.01) |
| H04L 5/14 | (2006.01) |
| H04B 1/401 | (2015.01) |
| H04W 88/08 | (2009.01) |
| H04B 1/403 | (2015.01) |
| H04W 56/00 | (2009.01) |

(52) U.S. Cl.
CPC .......... *H04L 7/0012* (2013.01); *H04B 1/401* (2013.01); *H04B 1/403* (2013.01); *H04L 5/14* (2013.01); *H04W 56/0015* (2013.01); *H04W 88/08* (2013.01)

(58) Field of Classification Search
CPC ......... H04N 7/182; H04N 5/04; H04W 56/00; H04L 12/66; H04L 5/12; H04L 12/56; H04J 3/06; H04J 3/00
See application file for complete search history.

(56) References Cited

U.S. PATENT DOCUMENTS

| | | | | |
|---|---|---|---|---|
| 2008/0259826 | A1* | 10/2008 | Struhsaker | H04W 84/14 370/280 |
| 2013/0301634 | A1* | 11/2013 | Ehlers | H04J 3/0664 370/350 |
| 2017/0332051 | A1* | 11/2017 | Stern | H04N 7/181 |

OTHER PUBLICATIONS

Vecima Networks, TR500 Transceiver.
Vecima Networks, TRI252 UHF Transceiver.
Touchstone;TG852 Telephony Gateway User's Guide.
TG852G DOCSIS 3.0 Residential Gateway; Technical Specification.
Vcom Inc.; Advanced Broadband Products Description.
MSDCSYS UHF Downconverter System; Installation and Operation Guide.
Touchstone DOCSIS 3.1 Ultra Fast Cable Modem; Product Description.
Casa Systems C100G Converged Cable Access Platform (CCAP); Data Sheet.
BT-CMTS-31000 Cable Modem Termination System; Specification Sheet.
Vecima Networks, Broadband Wireless Internet Network, Description.
Vecima Networks, UCD4900 UHC Downconverter, Data Sheet.
Touchstone CM8200 DOCSIS® 3.1 Cable Modem, User Guide.
BT-CMTS Series, Cable Modem Termination System with Integrated Edge QAM, Setup Guide.

* cited by examiner

*Primary Examiner* — Iqbal Zaidi
(74) *Attorney, Agent, or Firm* — Nathan V. Woodruff (57) ABSTRACT

A base station and the customer premises equipment (CPE) transceivers are configured to use a single master clock for all frequency conversions. The modem of each CPE has a clock output and that output is connected to the upconverter in the transceiver uplink or to both the upconverter and the downconverter as required.

18 Claims, 9 Drawing Sheets

Fig.1
Prior Art UHF Band Base Station and Customer Premises Equipment

Fig. 2

Prior Art UHF Band Cable Modem

Fig. 3

UHF Band Cable Modem with Master Clock Output

Fig. 4

Prior Art UHF Band Transceiver

Fig. 5

UHF Transceiver

Fig. 6

Prior Art S-Band Transceiver

Fig. 7
S-Band Transceiver

Fig.8

UHF Band Base Station

Fig.9

Prior Art S-Band Base Station

Fig.10
S-Band Base Station

FULL DUPLEX WIRELESS COMMUNICATION SYSTEM WITH SINGLE MASTER CLOCK

FIELD

This invention relates to a wireless communication system comprising a transceiver which uses an external Master Clock that is extracted from the radio frequency downstream signal sent from a Data Over Cable Service Interface Specification (DOCSIS) Cable Modem Termination System (CMTS) located at the Wireless Broadband System (WBS) base station, and the extracted clock is used for all frequency conversions in a frequency division duplex (FDD) wireless communication system operating in the UHF and other frequency bands (i.e. VHF, S-Band, C-Band, X-Band, etc.).

BACKGROUND

Rural communities around the world are in need of wireless broadband services of ever-increasing capacities as is frequently commented on by governments and news media. The efforts to supply such services often rely on setting up wireless base stations at towers and transmitting at low power and high frequency ranges using modulated carrier wave signals with moderate constellation sizes that are not equivalent to modern day wireline implementations. Furthermore, these systems generally have a small coverage area. Due to the small coverage area, these systems are not economically feasible to service large areas with low population densities.

Recently, DOCSIS based WBS employing the 470-860 MHz frequency range and operating in licensed UHF frequencies have been deployed in Canada to service First Nation communities as well as rural communities. Such systems also require a WBS tower. However, these systems do permit coverage of 2,000 to 3,000 sq. km or more, rather than the 75 to 100 sq. km coverage by other comparable wireless systems using higher frequencies and lower power levels.

The DOCSIS based WBS at the tower is in communication with a plurality of subscribers each of which has customer premises equipment (CPE) typically comprised of an antenna, a transceiver and a cable modem (CM).

In a full duplex DOCSIS based WBS, where downstream (DS) radio frequency (RF) signals are transmitted from a WBS tower to a plurality of CPE, these DS transmit signals, when received at the CPE via the antenna, are sent on to a transceiver that is in turn connected to a cable modem (CM). The transceiver initially separates the DS received signal from upstream (US) transmitted signals via a duplexer or similar such device. The DS received signals are then amplified and sent on to the CM via a second duplexer or similar such device. The CM then produces lower frequency band US signals that are sent to the transceiver. The US signals are separated at the transceiver via a duplexer or similar such device and up converted to a higher frequency signal, amplified and then sent to the antenna via a duplexer or similar such device.

In a typical DOCSIS 2.0 based cable TV system, the US stream signals are in the lower end of the frequency spectrum (5-42 MHz) and DS signals are in a higher frequency band (88 MHz-860 MHz). The US and DS signal frequency ranges are variable according to the needs of the cable plant and are configured with sufficient guard band separation so as not to operationally interfere with each other within the cable plant. The US signals generated by the CMs are not at the same frequencies at which the WBS antenna receives the US signals. These US signals are at much higher frequencies than produced by the CM. This condition requires the transceivers at the subscriber sites to up convert the CM's low frequency US signals to higher frequencies. The up conversion in the transceivers is done by using a RF frequency conversion with local oscillator (LO) generated signal going into the RF mixer and the second input being the US signals from the CM. The output signals of the RF mixer are then filtered via a Band Pass Filter (BPF) so only the correct high frequency US frequency signals are passed. The transceiver's high frequency US signal is amplified and fed into the duplexer or similar such device. The output of the duplexer is connected to the antenna that then transmits the high frequency US signals to the WBS base station. The WBS antenna at the base station receives the high frequency US signals and down converts them using a RF frequency conversion with integrated local oscillator (LO) going into the RF mixer along with high frequency US signals. The close to the original low frequency US signal output of the downconverter is fed into a Low Pass Filter (LPF) that only allows the low frequency US signals frequencies close to the original frequencies as generated by the CM at the subscriber site to pass through. The low frequency US signal output of the LPF is then fed into the CMTS US signal input.

The CMTS analyses the US signal for frequency and the data is decoded from the received US signal. Since each of the CMs operates with its own RF frequency conversion with its own independent LO and the CMTS is communicating with a large number of CMs, the CMTS analyses each US frequency transmission and if the CM US frequency is different than the frequency at which the CMTS was expecting to receive the CM US frequency, it instructs the relevant CM to adjust its US frequency so that it will match what the CMTS was expecting to receive. This process is done initially when the CM connects to the CMTS and is a continuing process between the CMTS and CMs continually communicating with each other and ensuring that each of the relevant CM's US frequencies is as close to the US frequency as expected by the CMTS. If any CM's US frequency is different than that expected by the CMTS, the CMTS will continue to request the relevant CM to adjust its US frequency until it operates within the tolerance limit of frequencies acceptable to the CMTS. Due to this correction mechanism, the transceiver's independent LO that could be slightly out of alignment but within the tolerance limit of the CMTS US frequency limit, and the LO of the downconverter at the WBS base station which could also be slightly out of alignment but also within the tolerance limit of the CMTS, are both accommodated and become operationally transparent to the CMTS and the connected cable modems. The slight imperfections of the LO in the transceiver at the subscriber end and downconverter at the WBS base station are corrected via this mechanism. This same mechanism also corrects the slight imperfections of the independent LO in the CM. With this correction mechanism in place, all the rest of the system components in combination operate within the tolerance limits imposed by the CMTS. This frequency correction mechanism does not exist in DOCSIS 3.1 US Orthogonal Frequency-Division Multiple Access (OFDMA) signals and higher versions of DOCSIS that use OFDMA on US. Therefore, the traditional transceiver with an independent LO would not work in a wireless DOCSIS 3.1 system when using an OFDMA signal in the US direction due to the frequency up conversion and frequency down conversion done using independent local clocks. In the DOCSIS 3.1 OFDMA system, all the US signals received from all CMs have to be within an extremely tight tolerance. Having independent up conversion LO at the subscribers' locations and independent down conversion at the WBS base station would create US signals that are outside the tolerance limits of the CMTS. So, the traditional transceiver would not work with OFDMA US signals.

The demands of modern-day telecommunications are to provide higher data rates for broadband customers. There is a constant demand to get more data throughput without using additional spectrum, which is a finite resource in any environment. One of the ways to meet this growing demand is to increase the data modulation of the broadband servicing system. With higher data modulation schemes, there is a requisite need for better clock synchronization throughout the broadband system components in order to successfully decode the higher modulation schemes.

With better clock synchronization, the decoded signal has fewer errors. With fewer errors the signal can be coded with higher data modulation thereby allowing higher data rate. One of the ways of reducing the signal to noise ratio (SNR) requirements on decoding a signal is to reduce the bandwidth of the individual transmit data channel. In DOCSIS 2.0, 2.1 and 3.0, the US signal is a Single Carrier Quadrature Modulated Signal (SCQAM), the specification of which defines US channel widths in resolutions of 200 KHz, 400 KHz, 800 KHz, 1.6 MHz, 3.2 MHz, and 6.4 MHz increments.

With DOCSIS 3.1 and higher versions, a new method of US signal was introduced called Orthogonal Frequency Division Multiple Access (OFDMA), where the US transmit subcarrier channel width has gone down to as small as 25 KHz. With such narrow channel widths, the clock synchronization between the CMTS and each of the CMs has to be much more precise than with higher channel widths. The correction mechanism of having the CMTS continually requesting the CMs to adjust the US frequency to get close to the expected frequency is not available as in prior versions of DOCSIS. To solve this problem, DOCSIS 3.0/3.1 and higher versions of DOCSIS protocol send out a Master Clock (MC) timing signal from the CMTS as part of the DS signal on SCQAM or Orthogonal Frequency-Division Multiplexing (OFMA) signal. This MC is then extracted by the CMs and is used to decode the data on the DS and also used to generate US modulated signals for OFDMA, in addition to the US carrier frequency. There are no CMs available that provide the MC output on the back of the CM as it is not necessary for a CM to be operational in a wired or wireless system.

Using a transceiver that has an independent LO that up converts the OFDMA US signal, and a second independent LO at the base station, converts the high frequency US signal back down to the original US frequency via a downconverter, does not produce a close enough frequency US signal as required by the CMTS. Furthermore, the DOCSIS 3.1 protocol provides no correction mechanism for the CMTS to instruct the CMs to modify the US frequency. Because of this issue, the US OFDMA signal cannot be successfully decoded by the CMTS when there are independent up and down frequency conversions in between the CM and the CMTS in WBS. Thus, the independent LO based transceivers no longer work for OFDMA US signals. This particular situation is present in all types of transceivers regardless of US frequencies (VHF, UHF, S-Band, 3.5 GHz, etc.).

A resolution to the forgoing local clock synchronization issue is needed in order to be able to use OFDMA for US channel transmission signaling and to take advantage of the significant improvement in SNR and much higher data modulation rates possible with OFDMA for US data transmission. In accordance with this invention, the solution to this problem is to use the CMTS MC and make it directly available to the transceivers. Instead of using the independent LO in the transceiver, the CMTS's extracted MC needs to be provided to the transceiver to generate the synchronized LO for the up conversion in the transceiver. This is accomplished, in accordance with the present invention, by utilizing for each transceiver, a cable modem, which is configured to provide a clock output and by connecting that output electrically to the downlink and uplink of each frequency converter in the transceiver, the modem clock operates to synchronize any local clocks in the transceiver. When these up converted higher frequency US signals are received at the WBS base station, the downconverter must again use the MC from the CMTS for the generation of the synchronized LO in the downconverter. What this in fact achieves is a single MC used for all frequency conversions in the transceiver at the subscriber locations and the downconverter at the WBS base station. With all the US signals from each of the CMs and transceivers, and downconverter synchronized to a single MC generated in the CMTS, much higher modulation levels of data can be coded on the US signals in a WBS, and OFDMA signals can be more precisely decoded by the CMTS. Overall, with these changes made on transceivers and the downconverter at the WBS base station, we can now receive OFDMA signals on the US and take advantage of all the benefits of the OFDMA signal on the US channels in a WBS. The up-frequency conversion done at the subscriber locations and the down-frequency conversion done at the WBS base station restore the precise US signals that the up and down frequency conversions have done and the up and down frequency conversions become operationally transparent between the CMTS and the CMs in a WBS.

Once the extracted MC is used to synchronize all the system devices, a DOCSIS 3.1 based WBS system is fully functional and is capable of being used at the same modulation as is achievable in a cable plant. With these changes the wireless part of the system becomes operationally transparent to the CMTS and CMs.

Thus, according to one aspect, the present invention relates to a frequency conversion circuit employed anywhere within the transmission path that is synchronized or slaved to a MC source extracted from the baseband signal generated by a single MC source situated at the WBS base station.

According to another aspect, any transceiver present along the transmission path that employs frequency conversion circuits with clock sources that are synchronized or slaved to the MC source, will transparently contribute to the continued synchronization of transmitted signals between the base station transmitter and the plurality of CPE devices. According to another aspect, the present invention requires a cable modem which has a clock output.

According to another aspect, the clock output of the modem has to be connected to the associated uplink and/or downlink at a point therein to synchronize or slave any local clocks in those links.

DETAILED DESCRIPTION

Figure 1:
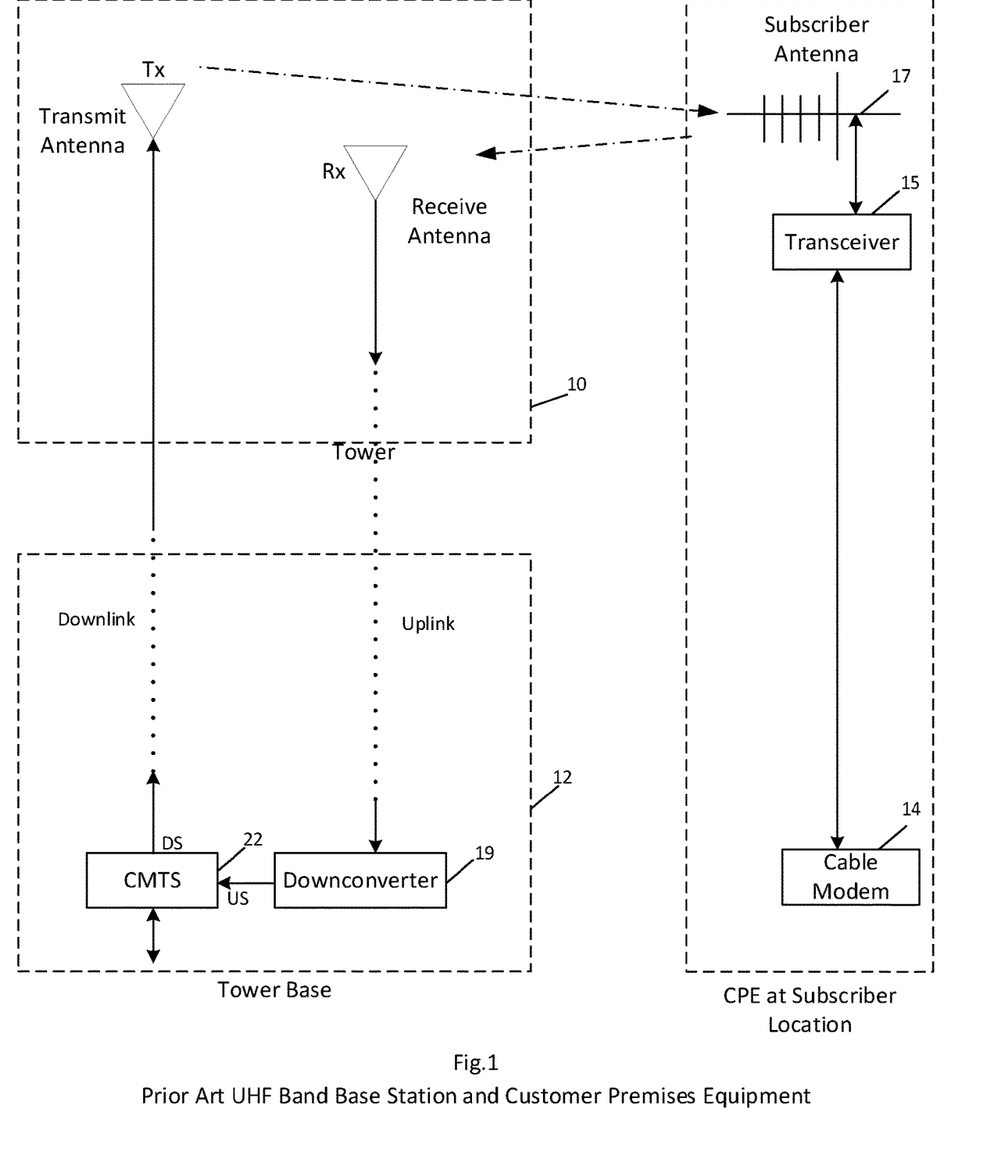
FIG. 1 is a generic block diagram of prior art UHF base station and customer premises equipment (CPE)

FIG. 1 shows a prior art the base station including a tower 10 and a base station 12 along with a representative CPE. The base station includes CMTS 22 and downconverter 19. The CPE comprises an antenna 17, a cable modem 14 and a transceiver 15.

Figure 2:
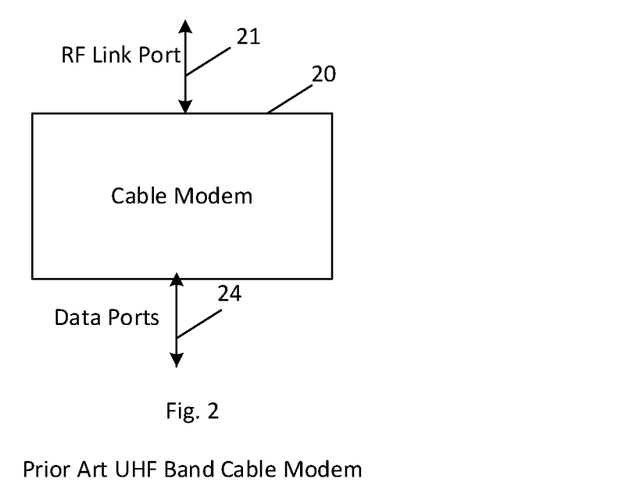
FIG. 2 is a block diagram of a prior art cable modem.

FIG. 2 shows a prior art cable modem 20 with RF link port 21 and data ports 24.

Figure 3:
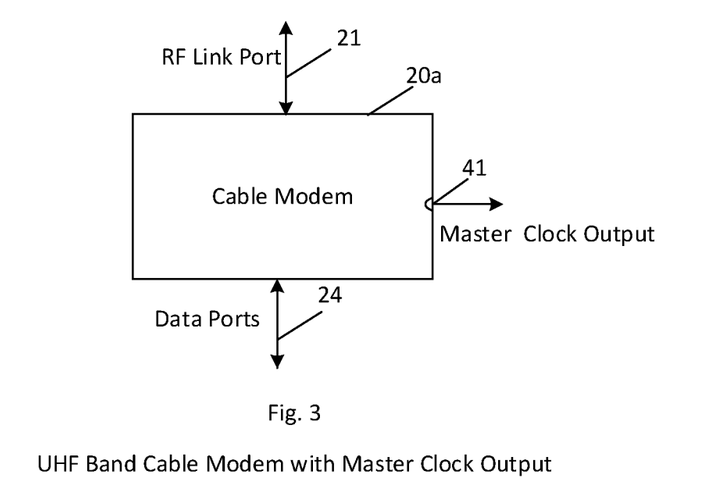
FIG. 3 is a cable modem in accordance with this invention.

FIG. 3 shows a UHF Band cable modem 20a in accordance with this invention. The cable modem can be seen to include a master clock output indicated at number 41.

Figure 4:
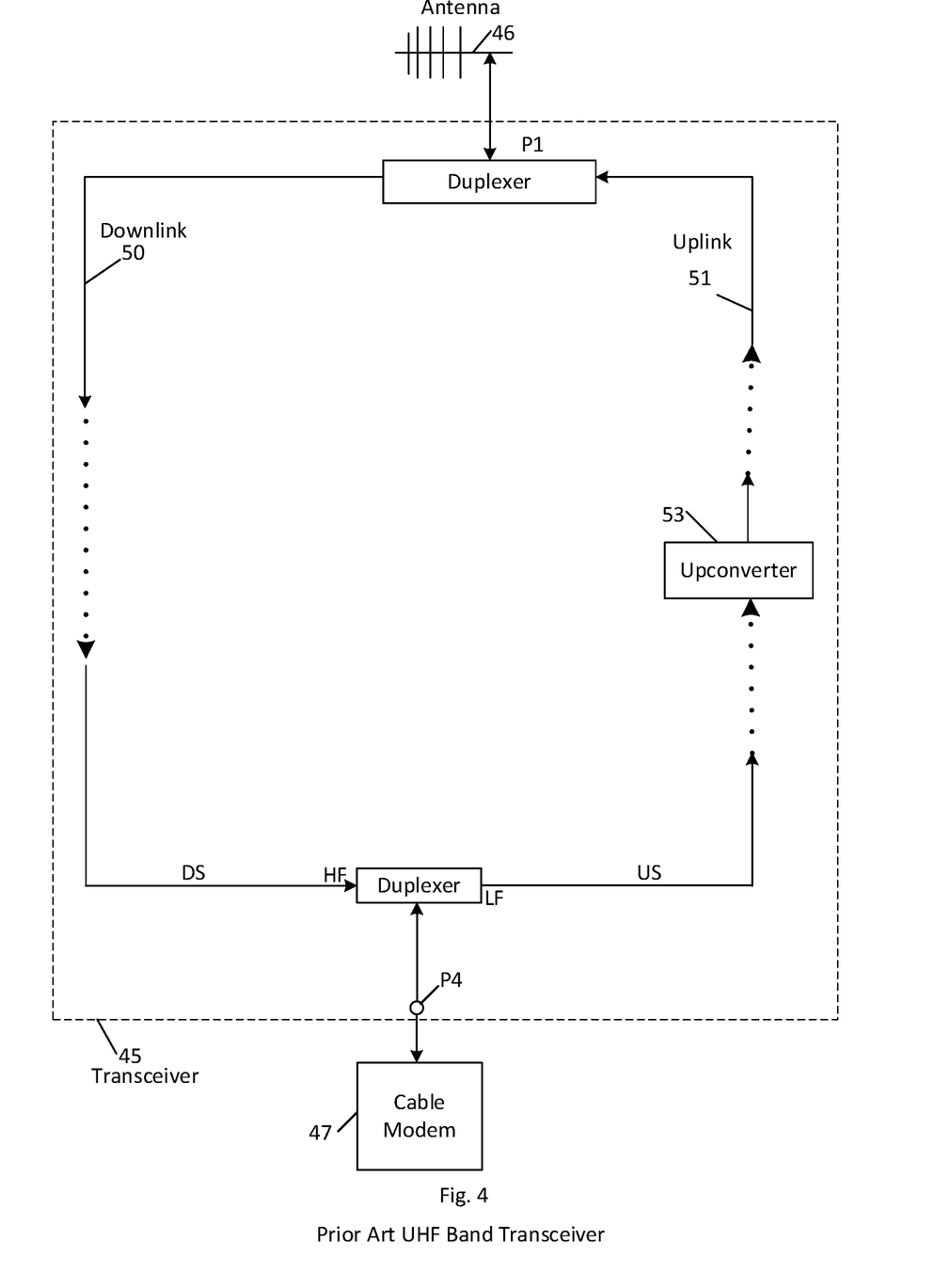
FIG. 4 is a block diagram of prior art UHF transceiver.

Each CPE of a wireless system includes a transceiver. FIG. 4 shows a prior art transceiver 45 connected between an antenna 46 and a cable modem 47, respectively. The transceiver includes a downlink 50 and an uplink 51. Uplink 51 includes an upconverter 53. The transceiver uplink and downlink include additional components as is well understood. These components are not shown herein because they are not changed in any way in accordance with this invention.

Figure 5:
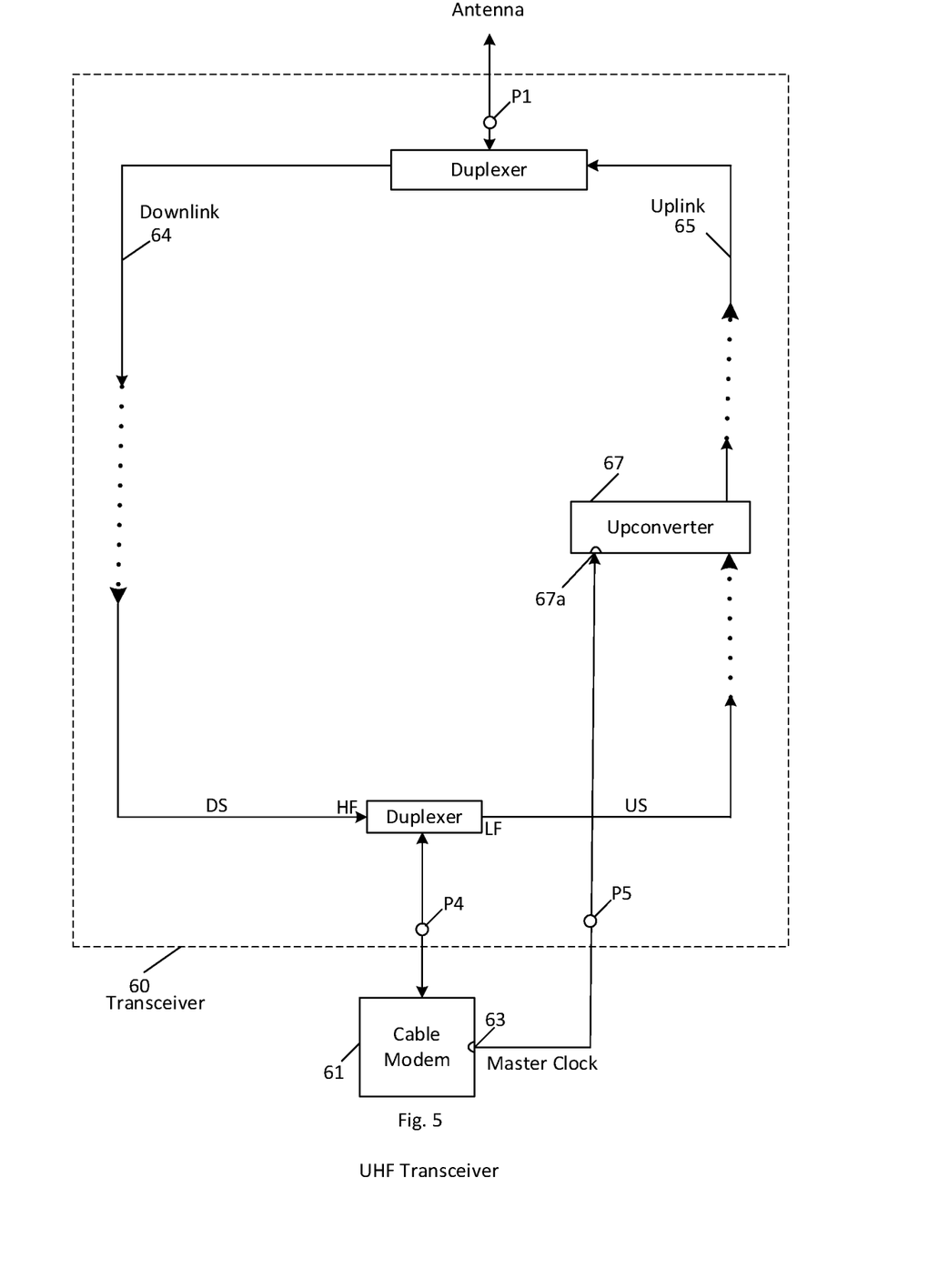
FIG. 5 is a block diagram of a UHF transceiver in accordance with this invention.

A UHF transceiver 60, in accordance with this invention, is represented in FIG. 5. Transceiver 60 is connected to cable modem 61 with a master clock output 63. Output 63 is connected to clock input port 67a on upconverter 67 located in uplink 65 in a manner to synchronize (or slave) the local oscillator in the upconverter 67.

Figure 6:
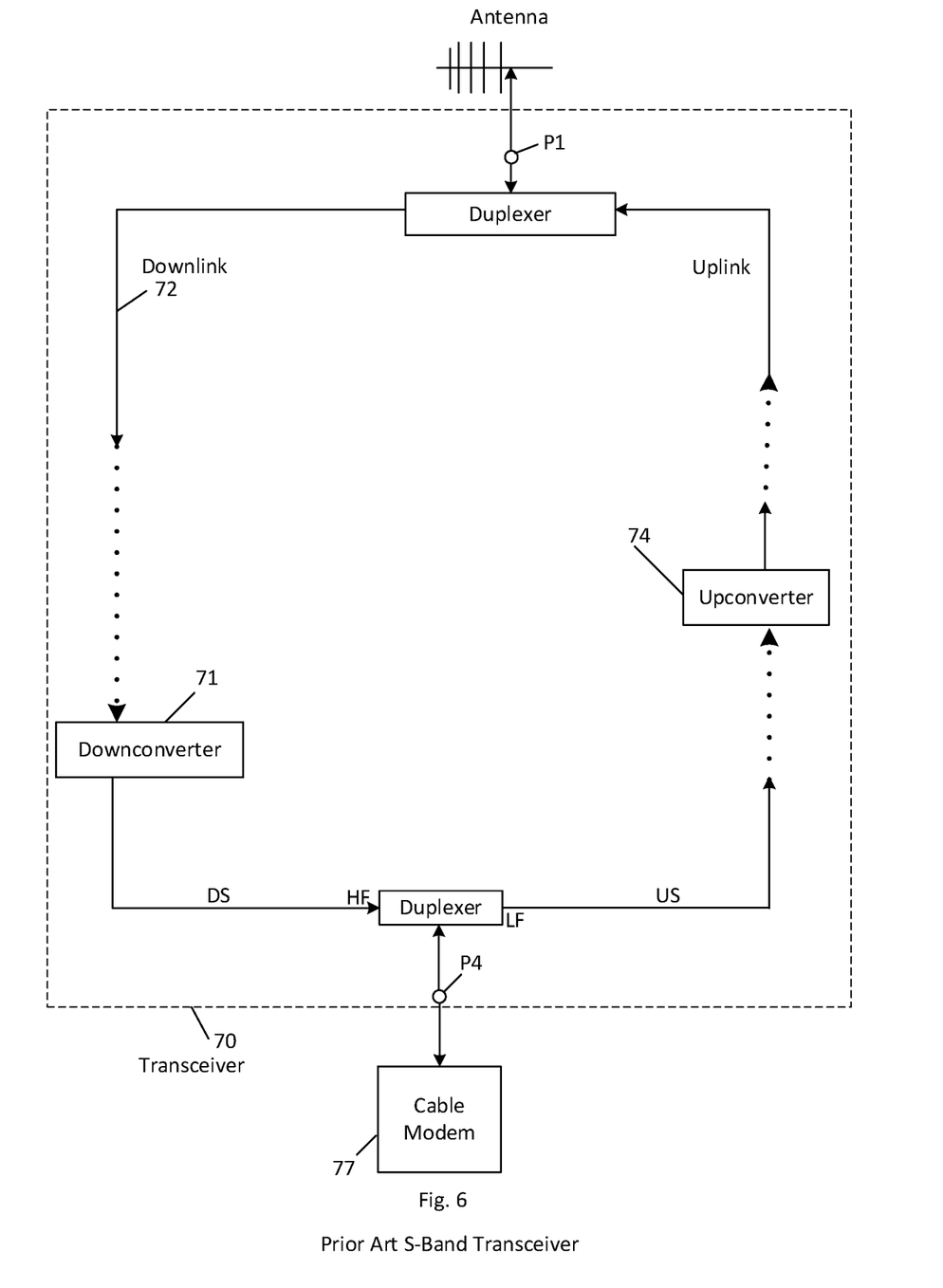
FIG. 6 is a block diagram of prior art S-Band transceiver.

The prior art S-Band transceiver 70 of FIG. 6, (compare with FIG. 4) shows a downconverter 71 in downlink 72 in addition to an upconverter (74).

Figure 7:
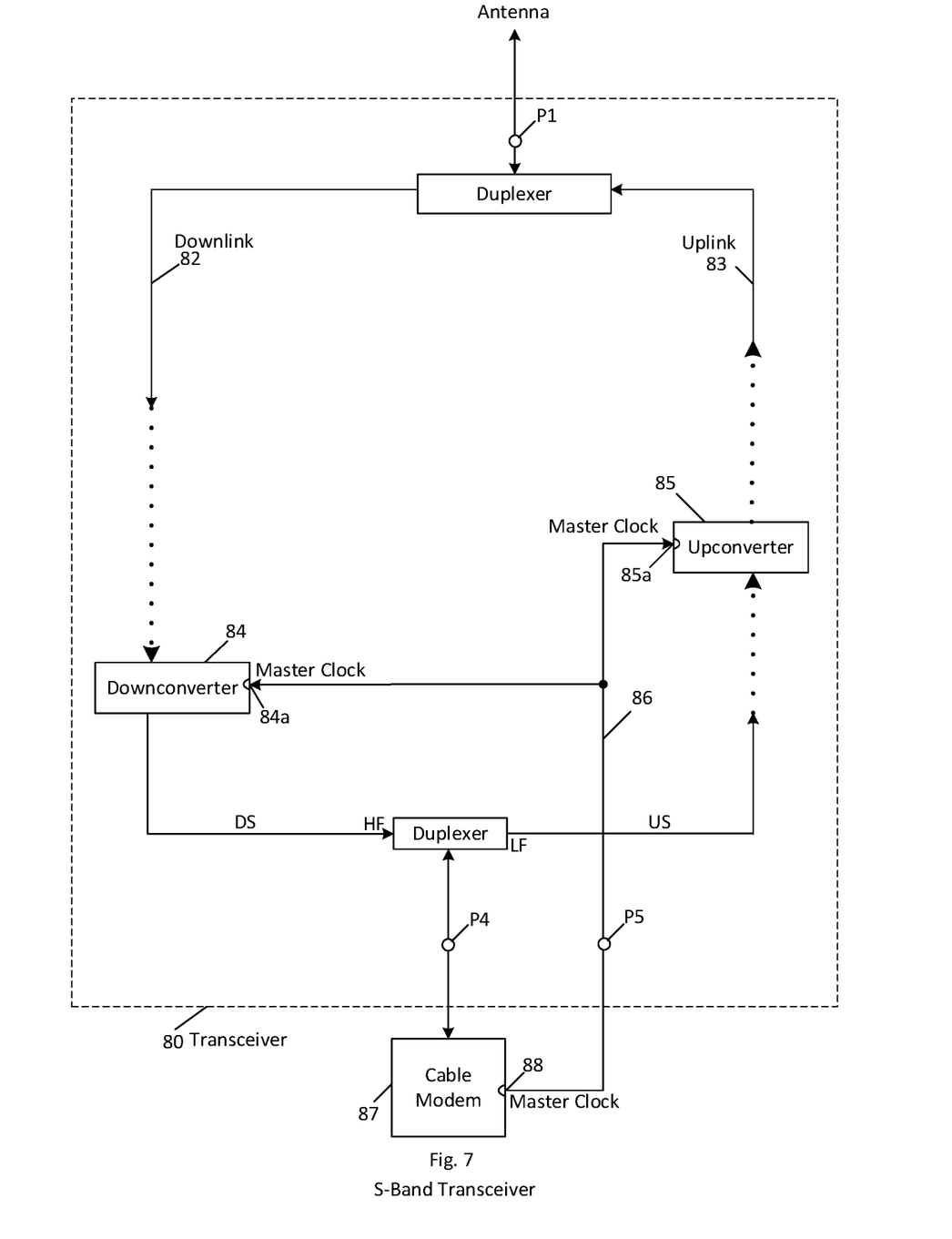
FIG. 7 is a block diagram of an S-Band transceiver in accordance with this invention.

FIG. 7. shows an S-Band transceiver 80 in accordance with the present invention, the transceiver includes downlink 82 and uplink 83. The downlink and the uplink include downconverter 84 and upconverter 85, respectively. Importantly, the S-Band transceiver of FIG. 7 includes the cable modem 87 of FIG. 3 with the master clock output 88 of the modem connected to clock input 84a on downconverter 84 and clock input 85a on upconverter 85 by conductor 86.

Figure 8:
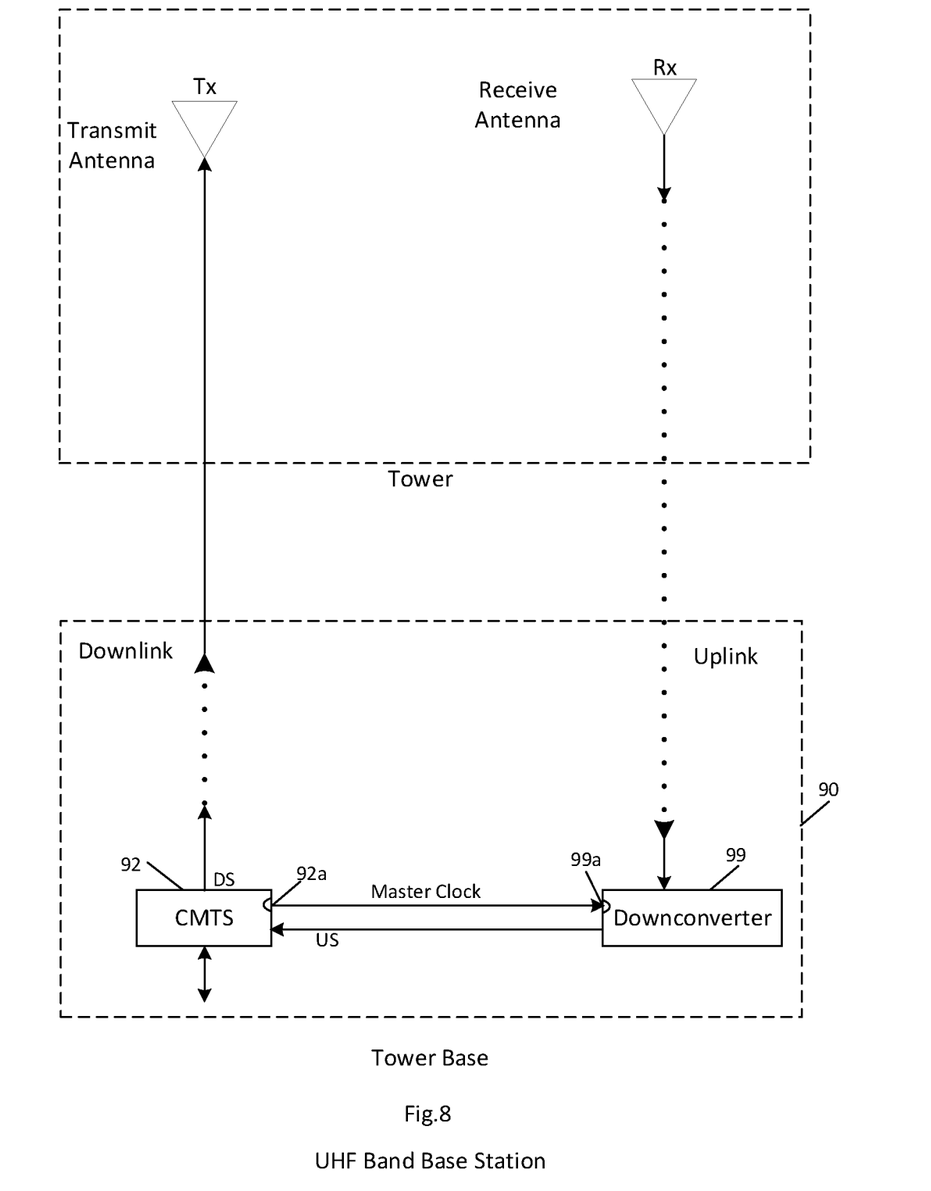
FIG. 8 a block diagram of a UHF Band base station in accordance with this invention.

FIG. 8 shows the configuration of the base station 90 for UHF Band operation. Here the uplink is shown to include downconverter 91 connected to the CMTS 92. In this embodiment of the invention, the CMTS may be reconfigured to comprise a clock output 92a that is connected to clock input port 99a on downconverter 99.

Figure 9:
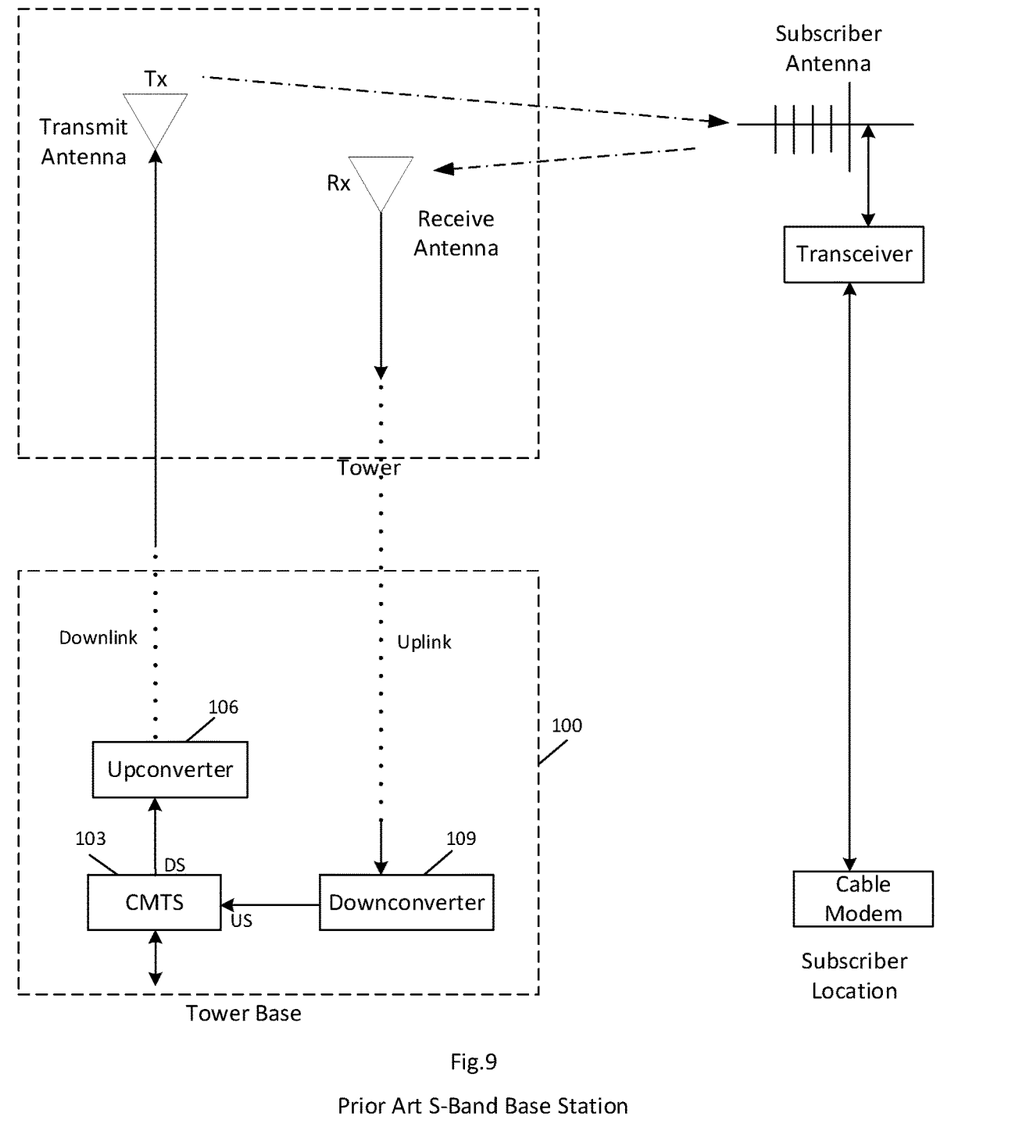
FIG. 9 a block diagram of a prior art S-Band base station.
Figure 10:
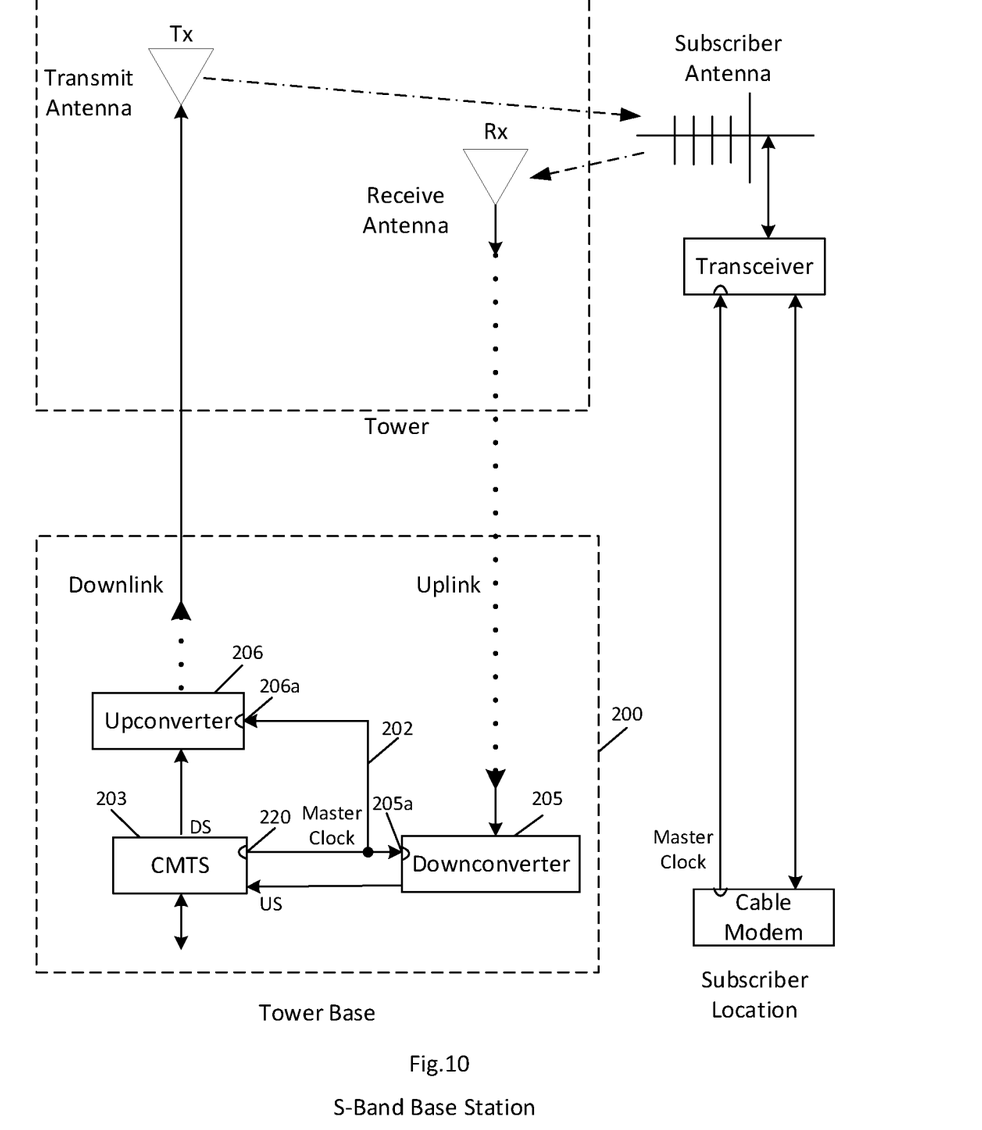
FIG. 10 is a block diagram of an S-Band base station in accordance with this invention.

A comparison of FIG. 9 with FIG. 10 illustrates that the prior art S-Band base station 100 does not include a master clock connection between the CMTS 103 and the upconverter 106 and downconverter 109. The S-band base station in accordance with this invention shown in FIG. 10 has a master clock output 220 on CMTS 203 that is connected to clock input 206a on upconverter 206 and to clock input 205a on downconverter 205.

It is important to understand that, in accordance with the present invention, the modem is reconfigured to provide a clock output and for UHF Band operation, the modem clock output is connected only to the upconverter as shown in FIG. 5. For an S-Band transceiver, the modem clock output is connected to both the upconverter and to the downconverter as shown in FIG. 7. Also, the connection point for the clock to the downconverter and the upconverter need only be along the downlink and the uplink such that the (master) clock from the modem is controlling any local clocks that are either synchronized with the master or slaved. The downconverters and the upconverts thus could be configured in the absence of local clocks.

The foregoing description relates to the base station and to CPEs and the inclusion of a reconfigured modem and the connection of a (master) clock. In the base station, the CMTS may provide the master clock to the downconverter in the UHF Band base station as shown in FIG. 8 and to both the downconverter and the upconverter for the S-Band base stations as shown in FIG. 10.

Since every CMTS has associated modems, the CMTS at the base station can be configured to connect to a local modem (see FIG. 3) that provided a master clock output that connects to the upconverter and downconverter as required at the base station for S-Band and UHF-Band operation in accordance with the invention where there is no master clock output on the CMTS.

What has been described herein is considered merely illustrative of the principles of this invention. Thus, it should be understood that those skilled in the art may be capable of producing modification thereof within the scope of the claims.

For example, anyone skilled in the art will understand that the base station includes a cable modem termination system could equally well directly provide the (master) MC on it output and that clock source could be designed to take an external input reference clock source and synchronize it Master Clock (MC) to the external input clock source. In this way, one could still use the external input reference clock source to which the upconverter and the downconverter would synchronize. Overall mechanism of using a single MC for the complete WBS would still be maintained.

What is claimed is:

1. A wireless communication system comprising a base station and a plurality of customer premises equipment, each of said customer premises equipment comprising a transceiver with a downlink comprising a downconverter and an uplink comprising an upconverter, each of said uplink and downlink being connected between a modem and an antenna, said modem comprising a clock output, said clock output comprising a master clock extracted by said modem from said downlink, said clock output being connected to said downlink in a manner to synchronize or slave a local clock in said downconverter, and said clock output being connected to said uplink in a manner to synchronize or slave a local clock in said upconverter.

2. A wireless communication system as in claim 1, wherein said upconverter comprises an external clock input.

3. A wireless communication system as in claim 2, wherein said downconverter comprises an external clock input.

4. A modem with a radio frequency port, a data port, and a clock output port that is separate and distinct from said data port, said modem being configured to extract a master clock from signals received via said radio frequency port and transmit the master clock via said clock output port, wherein said modem is configured to demodulate and modulate signals using a protocol comprising Data Over Cable Service Interface Specifications (DOCSIS) version 3.1 or higher said clock output synchronizes signals in said uplink, said downlink, or both said uplink and said downlink to comply with said protocol.

5. Customer premises equipment comprising a transceiver, said transceiver comprising a downconverter with an external clock input, an upconverter with an external clock input, and a modem with a radio frequency port, a data port, and a clock output port that is separate and distinct from said data port, said modem being configured to extract a master clock from signals received via said radio frequency port, and transmit said master clock via said clock output port.

6. A full duplex wireless communication system, said system comprising a plurality of transceivers connected to a plurality of modems, said transceivers being characterized by the absence of local clocks, and said modems being configured to extract a master clock from a downlink signal from said transceivers and transmit said master clock to downstream equipment, wherein said downlink comprises a downconverter and said master clock is connected to said downlink in a manner to synchronize or slave a local clock in said downconverter.

7. A wireless base station for a wireless communication system, said base station comprising:
an uplink connected between an antenna and a cable modem termination system (CMTS), said uplink comprising a downconverter, said CMTS configured to output a radio frequency signal comprising a master clock via a radio frequency port; and
a modem that is connected to receive signals from said radio frequency port, said modem being configured to extract said master clock from said radio frequency signal and output said master clock via a modem clock output port, said modem clock output port being connected electrically to said uplink at a point between said downconverter and said CMTS.

8. A base station as in claim 7 further comprising an upconverter in the downlink, said modem clock output port being connected electrically to said downlink at a point between said upconverter and said CMTS.

9. A base station as in claim 7 comprising an ultra high frequency (UHF) transceiver with an upconverter, said CMTS being connected to said uplink in a manner to impose said master clock on said downconverter.

10. A full duplex wireless communication system comprising a base station and a plurality of customer premises equipment, said base station having a single master clock that is transmitted wirelessly from said base station to said plurality of customer premises equipment, said customer premises equipment comprising a downconverter in the absence of an operative local clock and said customer premises equipment receiving said single master clock and being configured to use said single master clock for all frequency conversions.

11. Customer premises equipment comprising an upconverter in the absence of an operative local clock, a downconverter in the absence of an operative local clock, and a modem with a radio frequency port, a data port, and a clock output port that is separate and distinct from said data output port, said modem being adapted to extract a master clock from signals received via said radio frequency port.

12. A wireless communication system comprising a base station and a plurality of customer premises equipment, each of said customer premises equipment comprising a transceiver with a downlink and an uplink comprising an upconverter, each of said uplink and downlink being connected between a modem and an antenna, said modem comprising a clock output, said clock output comprising a master clock extracted by said modem from said downlink, and said clock output being connected to said uplink in a manner to synchronize or slave a local clock in said upconverter, wherein said modem is configured to modulate and demodulate signals using a protocol comprising Data Over Cable Service Interface Specifications (DOCSIS) version 3.1 or higher and said clock output synchronizes signals in said uplink, said downlink, or both said uplink and said downlink to comply with said protocol.

13. A wireless communication system as in claim 12 wherein said downlink comprises a downconverter and said modem clock output is connected to said downlink in a manner to synchronize or slave a local clock in said downconverter.

14. A wireless communication system as in claim 12, wherein said transceiver comprises an upconverter with an external clock input.

15. A wireless communication system as in claim 14, wherein said transceiver comprises a downconverter with an external clock input.

16. A wireless communication system comprising a base station and a plurality of customer premises equipment, each of said customer premises equipment comprising a transceiver with a downlink and an uplink, said downlink comprising a downconverter having an external clock input and said uplink comprising an upconverter, each of said uplink and downlink being connected to a modem, said modem comprising a clock output, said clock output comprising a master clock extracted by said modem from said downlink, and said clock output being connected to said uplink in a manner to synchronize or slave a local clock in said upconverter.

17. The wireless communication system of claim 16 wherein said uplink and said downlink are connected between an antenna and said modem.

18. A transceiver for a wireless communication system, the transceiver comprising a modem with a radio frequency port, a data port, and a clock output port that is separate and distinct from said data port, said modem being configured to extract a master clock from signals received via said radio frequency port and transmit the master clock via said clock output port, said clock output port being connected to said downlink in a manner to synchronize or slave a local clock in said downconverter.

* * * * *